(12) United States Patent
Sanchis Estruch et al.

(10) Patent No.: US 10,105,978 B2
(45) Date of Patent: Oct. 23, 2018

(54) MEDIA HANDLING SYSTEM ASSEMBLY (71) Applicant: HEWLETT-PACKARD DEVELOPMENT COMPANY, L.P., Houston, TX (US)

(72) Inventors: Ricardo Sanchis Estruch, Barcelona (ES); Daniel Gonzalez Perello, Barcelona (ES); Joaquim Brugue Garvi, Sant Cugat del Valles (ES); Pol Morral, San Cugat del Valles (ES); Marcel Llorach, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/313,443

(22) PCT Filed: Apr. 15, 2015

(86) PCT No.: PCT/EP2015/058200
§ 371 (c)(1),
(2) Date: Nov. 22, 2016

(87) PCT Pub. No.: WO2015/185255
PCT Pub. Date: Dec. 10, 2015

(65) Prior Publication Data
US 2017/0182817 A1   Jun. 29, 2017

(30) Foreign Application Priority Data

Jun. 2, 2014 (WO) ................. PCT/EP2014/061338

(51) Int. Cl.
*B41J 29/02* (2006.01)
*B41J 29/06* (2006.01)
(Continued)

(52) U.S. Cl.
CPC .............. *B41J 29/02* (2013.01); *G03G 15/00* (2013.01); *G03G 21/1619* (2013.01); *F16M 11/22* (2013.01)

(58) Field of Classification Search
CPC .. B41J 29/02; B41J 29/04; B41J 29/06; B41F 13/0024; B21L 331/02; F16M 11/22;
(Continued)

(56) References Cited

U.S. PATENT DOCUMENTS

| 4,108,297 A | 8/1978 | Durr et al. |
| 4,688,692 A | 8/1987 | Humbs et al. |

(Continued)

FOREIGN PATENT DOCUMENTS

| CN | 202782212 | 3/2013 |
| EP | 0627307 | 12/1994 |

(Continued)

OTHER PUBLICATIONS

Soler, et al. Efficient Color Printer Characterization Based on Extended Neugebauer Spectral models.

*Primary Examiner* — Anh T. N. Vo
(74) *Attorney, Agent, or Firm* — HP Inc. Patent Department (57) ABSTRACT

An assembly of a large format media handling system comprises a planar cross structure, and a support structure, the support structure including two side supports, wherein the two side supports extend perpendicularly to the cross structure and are connected to the cross structure at respective side edges of the side supports. A tensioning component is associated with each of the side supports, wherein the tensioning component transmits a tensioning force between the cross structure and the side edges of the side supports in a direction parallel to the side supports.

20 Claims, 11 Drawing Sheets (51) Int. Cl.
*G03G 15/00* (2006.01)
*G03G 21/16* (2006.01)
*F16M 11/22* (2006.01)

(58) Field of Classification Search
CPC ........ F16M 11/24; F16M 11/42; G06K 15/12;
G06K 15/14; G03G 15/00; G03G
21/1619; G03G 21/1623; G03G 21/1647;
G03G 2221/1684
See application file for complete search history.

(56) References Cited

U.S. PATENT DOCUMENTS

| | | | |
|---|---|---|---|
| 5,441,589 A * | 8/1995 | Groswith | B41F 19/068 101/27 |
| 5,543,891 A | 8/1996 | Setoriyama | |
| 5,558,018 A * | 9/1996 | Leinonen | D21G 1/002 100/163 A |
| 6,636,338 B1 | 10/2003 | Kida et al. | |
| 6,786,144 B2 * | 9/2004 | Williams | D06B 15/02 100/168 |
| 7,128,302 B2 * | 10/2006 | Dubensky | E04B 1/3483 248/638 |
| 7,997,196 B2 | 8/2011 | Whelan | |
| 8,393,269 B2 * | 3/2013 | Kummet | B41F 13/0024 101/216 |
| 2004/0060918 A1 | 4/2004 | Woodlief | |
| 2004/0134368 A1 | 7/2004 | Gottling et al. | |
| 2007/0036528 A1 | 2/2007 | Okabe | |
| 2007/0071498 A1 | 3/2007 | Ueda | |
| 2007/0077087 A1 | 4/2007 | Okabe et al. | |
| 2008/0007935 A1 | 1/2008 | Kondo | |
| 2008/0310879 A1 | 12/2008 | Kotsuka et al. | |
| 2009/0092414 A1 | 4/2009 | Tomatsu | |
| 2010/0028043 A1 | 2/2010 | Hashimoto et al. | |
| 2010/0135694 A1 | 6/2010 | Hashimoto et al. | |
| 2011/0318055 A1 | 12/2011 | Kato et al. | |
| 2012/0195633 A1 | 8/2012 | Okabe | |
| 2013/0264457 A1 | 10/2013 | Ueyama | |

FOREIGN PATENT DOCUMENTS

| | | |
|---|---|---|
| JP | H10 161507 A | 6/1998 |
| JP | 2004302194 | 10/2004 |
| JP | 2010 204354 A | 9/2010 |
| WO | WO 2013091915 | 6/2013 |

* cited by examiner

MEDIA HANDLING SYSTEM ASSEMBLY

Large format media handling systems, such as large format printers, 3D printers, scanned, folding and cutting machines, industrial printers and the like, include base support structures that provide structural stiffness to a compendium of sub-systems which might weigh several hundreds of kilogram and, at the same time, they provide dimensional accuracy to these sub-systems good enough to enable high resolution in processing the media, equivalent to that reached by e.g. table-top size printers and scanners. A large format printer may, for example, weigh about 500 kg and hence needs a supporting structure sufficiently strong to support and align all of the printer's subsystems, such as a print platen, a printhead assembly, a print media transport system, a print media holder, a print media input section, a print media output section and the like. While the supporting structure needs to be strong enough to carry all the weight, it also has to be precisely aligned so that printing or otherwise processing a media can be performed with high resolution and accuracy.

SHORT DESCRIPTION OF DRAWINGS

Examples of this disclosure are now described with reference to the drawings in which.

DETAILED DESCRIPTION OF EXAMPLES

In the following description, examples of an assembly of a large format media handling system and a method of assembling the same are described with reference to the drawings. In the examples of the drawings, a large format printer is illustrated, using the assembly as a base support structure. The present disclosure is not limited to this example but can be used for any other large format media handling system, such as scanners, copying machines, industrial printers, offset printers, 3D printers, post-production machines and the like.

When, in the following description, reference is made to the relative orientation or movement of parts shown in the drawings, such as by using the terms "upper", "lower", "bottom", "top", "sideways" etc., the description refers to the orientation of said parts as shown in the respective drawing described.

In the examples described, the assembly comprises a planar longitudinal cross-structure, also referred to as base plate 10, and a support structure including two side supports, also referred to as side plates 12, 14. Instead of plates, a frame structure or other supporting structure could be used, but reference is made to a base plate and side plates for ease of explanation. For facilitating this description, the planar longitudinal cross-structure hence will be referred to as cross beam or base plate 10, and the side supports will be referred to as side plates 12, 14, in the following examples. In the example described herein, the assembly eventually will serve as a base support structure for a large format media handling system, which will be referred to as large format printer in the following description, without implying any limitation of this disclosure to a printer. The base support structure provides a highly accurate mounting platform including precisely aligned mounting points for sub-structures of the large format printer and having high structural rigidity and support strength. Examples of sub-structures structures which can be supported by a mounting platform in a large format printer are a media handling sub-system, a media transport sub-system, a printing mechanism, a scanning mechanism, a media input section, a media output section and the like. The mounting platform provides structural stiffness to all of these sub-systems which may weight up to many hundreds of kilograms and, at the same time, provides dimensional accuracy sufficient to allow a high resolution printing process and meet image quality (IQ) specifications. Longitudinal cross-structures carrying the sub-systems may introduce big dimensional tolerances from side to side of the machine which make longitudinal sub-system hard to align to one another.

As described below, the assembly and method of this disclosure allow the base plate to copy an eight-point planar reference coming from well-positioned side plates, the side plates being positioned through an assembly jig. Aligning the base plate to the side plates is achieved by providing a number of references positioning the base plate relative to the side plates such that the base contacts the references on the side plates, and then fixing the base plate to the side supports by applying a tensioning force between the side plates and the base plate, in a direction parallel to the side plates or in the common assembly direction. It hence is possibly to conserve said tensioning force and prevent bending and twisting moments between the joined parts.

In the example of the assembly described, when the base plate contacts side edges of the side plates, and is precisely aligned relative to the side plates by means of references, this relative position is conserved by a preloaded connection wherein a tensioning force or pulling force is applied between the base plate and the side plates, in a direction parallel to the side plates, and is conserved or "frozen" by means of tightening elements. The tensioning force pulls the base plate and the side plates towards each other and hence also may be referred to as a pulling force. As the base plate, resting on the side edges of the side plates, is tightened against the side plates in the direction parallel thereto, introducing the tensioning force in the plane of the side plates, the joint does not introduce bending moments to the side plates which could affect the perpendicularity between the side plates and the structure of the base plate. A very good perpendicularity between the side plate and the base plate hence can be maintained with high accuracy.

The assembly and the method of assembling the structure are now illustrated with reference to the drawings. In the example described, the assembly comprises fixed references and adjustable references on the side plates to improve accuracy of positioning the base plate relative to the side plates. The base plate first is positioned against the fixed references and, subsequently, the adjustable references are adjusted so that the base plate contacts the fixed references and the adjustable references.

This is illustrated with reference to FIGS. 1 and 2 wherein the fixed references are shown schematically by fixed reference line 16 and the adjustable references are shown schematically by dotted lines 18.

Figure 3:
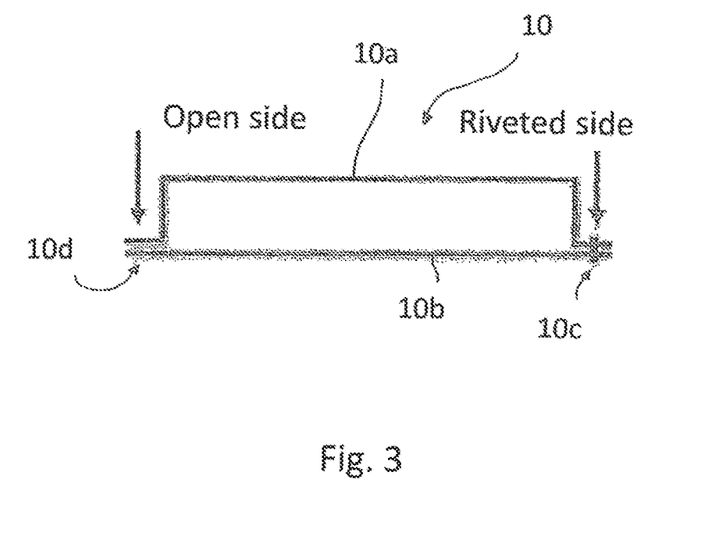
FIG. 3 schematically shows a cross section through a cross beam, according to one example.

In the example shown in the figures, the base plate 10 is a sheet metal part having a generally closed profile (which is initially open along one edge, to reduce the torsional rigidity of the base plate during the assembly process), shown schematically in FIG. 3. It may be constructed from a U-shaped profile 10a and a flat sheet 10b which are closed along both longitudinal edges by any suitable fastening means, such as rivets, screws, welding or the like. The profile of the base plate may include additional reinforcement structures, such as ribs, longitudinal and transverse reinforcement beams or the like. During the assembly process, the profile of the base plate 10 initially is closed along one of its longitudinal side edges 10c wherein the profile is open along the other longitudinal side edge 10d so that the base plate 10 has little torsional stiffness and provides a relatively "soft" body which allows some torsional movement during the mounting process in order to copy the references given by the lateral side plates.

Figure 1:
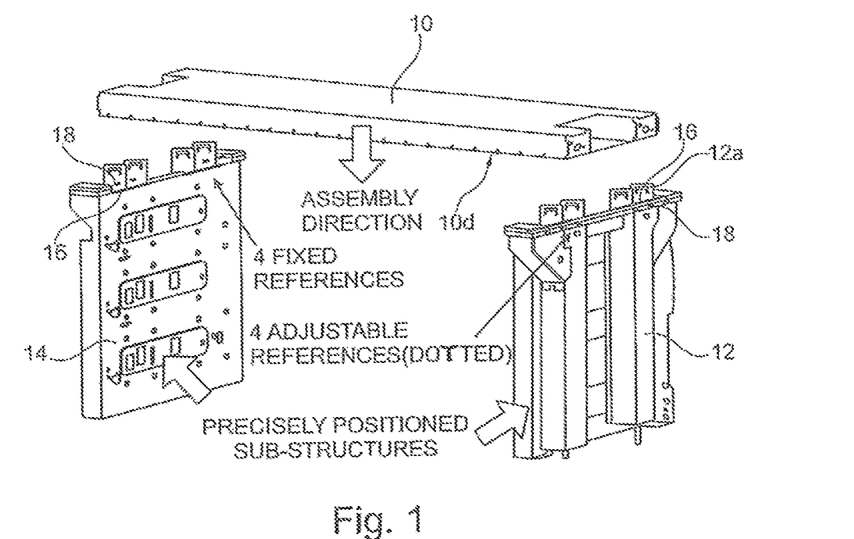
FIG. 1 shows an example of parts of a large format media handling system during assembly.
Figure 2:
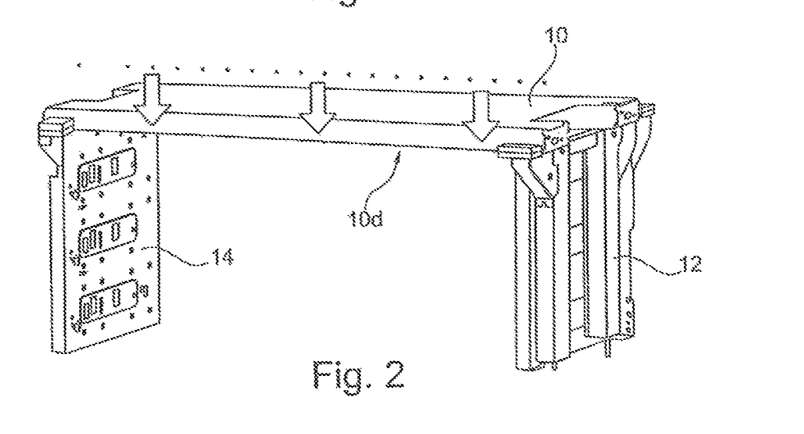
FIG. 2 shows the parts of FIG. 1, illustrating another stage of an assembly process, according to one example.

As shown in FIGS. 1 and 2, the base plate 10 is positioned over the side edges of two lateral side plates 12, 14, thereby contacting three of four fixed references 16 which, in the example described, are reference lines, which may be formed by parts of the upper and inner edges of the side plates, illustrated in further detail below. After a three-point contact has been established, a small vertical force is applied to the top of the base plate 10, as suggested by the downwards facing arrows in FIG. 2. The vertical force is just big enough to impart a small torsional movement to the base plate 10, the base plate, at that time, having very low torsional rigidity so that the base plate 10 comes into contact with all of the four fixed references 16 in order to copy the references. In the example shown in FIG. 1, each of the side plates 12, 14 provides two fixed references 16 which, under the presumption that the side plates 12 are perfectly positioned, using an assembly jig or the like, all lie within one horizontal plane. Once the base plate has been referenced to the fixed references 16 of the side plates 12, 14, there will be a defined gap between the base plate's lower contact surface and the four adjustable references 18, with two adjustable references at each side plate 12, 14. The adjustable references 18 may be based at the upper and outer edges of the side plates 12, 14. Having the base plate contacting the four fixed references 16 of the side plate, while maintaining the vertical force, the adjustable references 18, attached to the side plates 12, 14 are moved towards the base plate 10, making these parts contact the bottom surface of the base plate 10 and hence establishing an 8-point contact between the base plate 10 and the side plates 12, 14. This stage of the assembly process is shown in FIG. 2.

Once the 8-point contact has been established, the base plate 10 can be fixed to the side plates 12, 14, and the side edge 10d of the base plate can be closed, e.g. by rivets, screws, welding or the like, and hence be "frozen" in its current position and alignment relative to the side plates 12, 14. As a result of the assembly process, an isostatic joint can be generated between the base plate 10 and the side plates 12, 14, with virtually no twist of the base plate. Further details of this process and of the assembly are described with reference to the following drawings.

Figure 4:
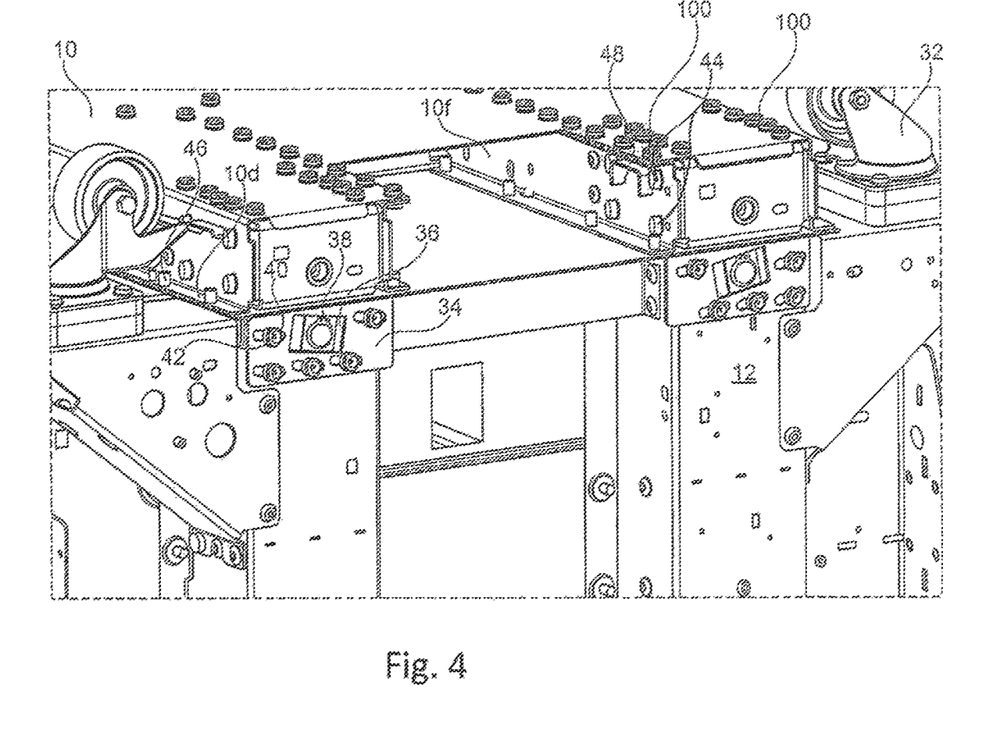
FIG. 4 shows an enlarged view of a part of FIG. 2 to illustrate some details of the assembly, according to one example.
Figure 5:
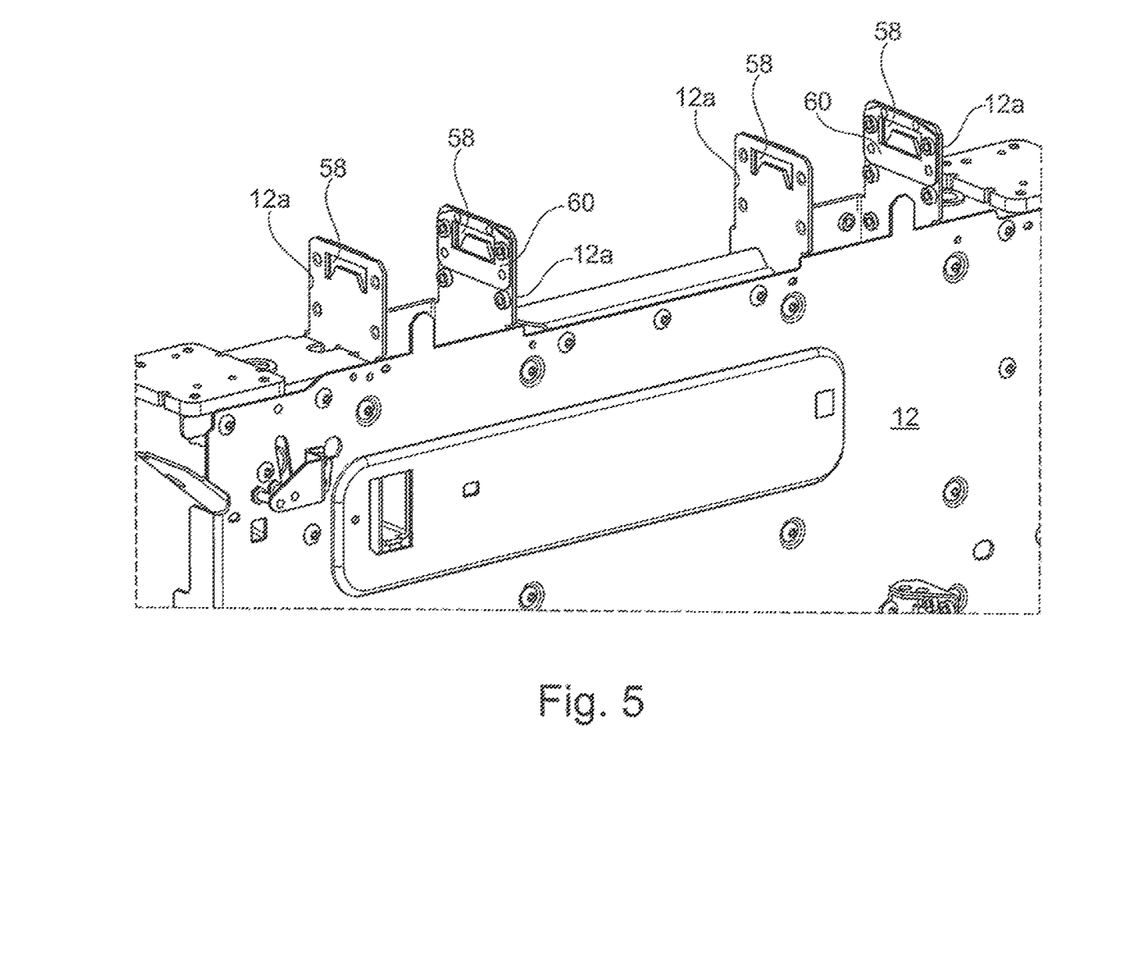
FIG. 5 shows an enlarged view of a part of FIG. 1 to illustrate some details of the assembly, according to one example.

FIGS. 4 to 7 show enlarged detailed views of parts of the assembly, illustrating how the references are adjusted and the connection between the base plate and the side plates is made and maintained. FIG. 4 illustrates the adjustable references 18 are adjusted to rest against the contacting bottom surface of the base plate 10 and how the base plate 10 is fixed to one of the side plates 12. In the present example, the adjustable references 16 comprise wedges 34 which are attached to outer side faces of the side plates 12, 14 and which can be moved sideways so as to impart a slight movement (in the drawing upwards) towards the base plate 10. The example of the wedges 34 shown comprises a number of longitudinal holes 36, 40, a guide element 38 and a member of fixing elements 42, such as screws, clamps or the like. When the wedges 34, used as adjustable references, are to be positioned against the contacting surface of the base plate 10, the screws and other fixing elements 38, 34 will be loosened and the wedges 34 will be moved sideways and hence also upwards (as seen in the drawing) so that their longitudinal edges facing the contacting surface of the base plate 10 come to rest against the base plate. Once contact has been established between the upper edges of the wedges 34 and the base plate, the screws or other fixing elements can be closed. In this example, screws 42 are used for holding the wedges 34 against the side plate 12 whereas reference number 38 designates a guide element for controlling the lateral and vertical movement of the associated wedge 34. Guide element 38 may be implemented by a shaft that also can support vertical forces/loads imparted by the side plates against the base plate.

Figure 6:
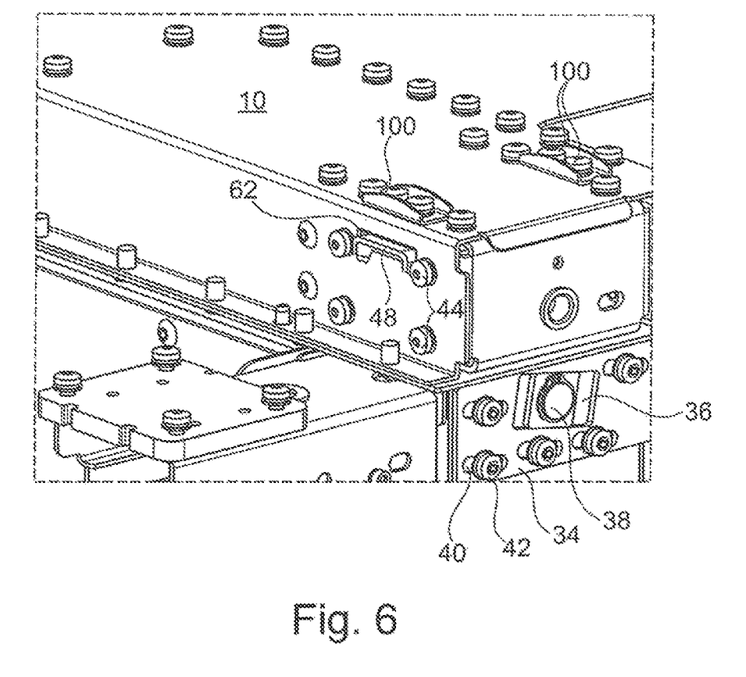
FIG. 6 shows an enlarged perspective view of a connection between a side plate and the cross beam to illustrate further details of the assembly, according to one example.
Figure 7:
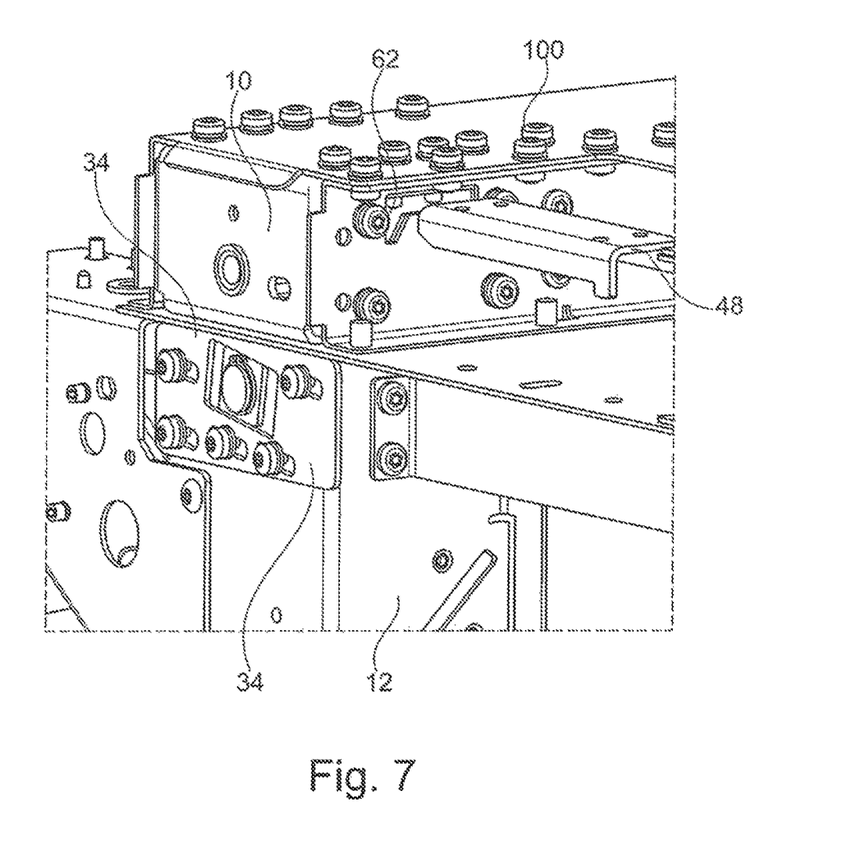
FIG. 7 shows another enlarged view of the connection between the side plate and the cross beam to illustrate further details of the assembly, according to one example.

FIGS. 4, 6 and 7 also show how the side plates 12 can be fixed to the base plate 10. In the example shown in the drawings, the side plates 12, at their side edges, comprise projections 12a, shown in FIGS. 1 and 5. The projections 12a comprise recesses 58 and further may include reinforcement plates 60 surrounding the recesses 58 in the upper part of the projections 12a. These projections 12a may be inserted through respective holes (not shown) at the surface of the base plate 10 contacting the side edges of the side plates. After the projections 12a have been inserted through the contacting surface of the base plate 10, in the example shown, a tensioning component is inserted through corresponding recesses 62 in the side faces of the base plate and through the recesses 58 of the projections 12a and hence is engaged with the projections 12a. This is best illustrated in FIG. 7, which shows how the U-shaped profile 48 is inserted through recesses 62 of the base plate 10, with the projections 12a (not shown in FIG. 7) of side plate 12 extending into base plate 10. In this example, the tensioning component comprises U-shaped profiles 42 which are inserted at both ends of the base plate, extending parallel to the side plates 10. The U-shaped profiles 48 hence are engaged with the extensions 12a to provide tensioning components at the side edges of the side plates 12. In the example shown, screws 100 are inserted from the surface of the base plate 10, opposite to the side plates 12, the screws 100 extending through the base plate's surface and the U-shaped profile 48 and, when threaded into the base plate, the screws pull the U-shaped profiles 48 and hence the side plates 12 towards a base plate 10. The U-shaped profile 48 and the screws 100 hence apply a preload to the joint between the base plate 10 and the side plates 12, pulling the side plates against the base plate while maintaining the relative position between the side plates and the base plate and generating internal preloading force in the axial direction. The preloading force is applied between the side edges of the side plates and the base plate in a direction of making contact, parallel to the side plates.

Figure 8:
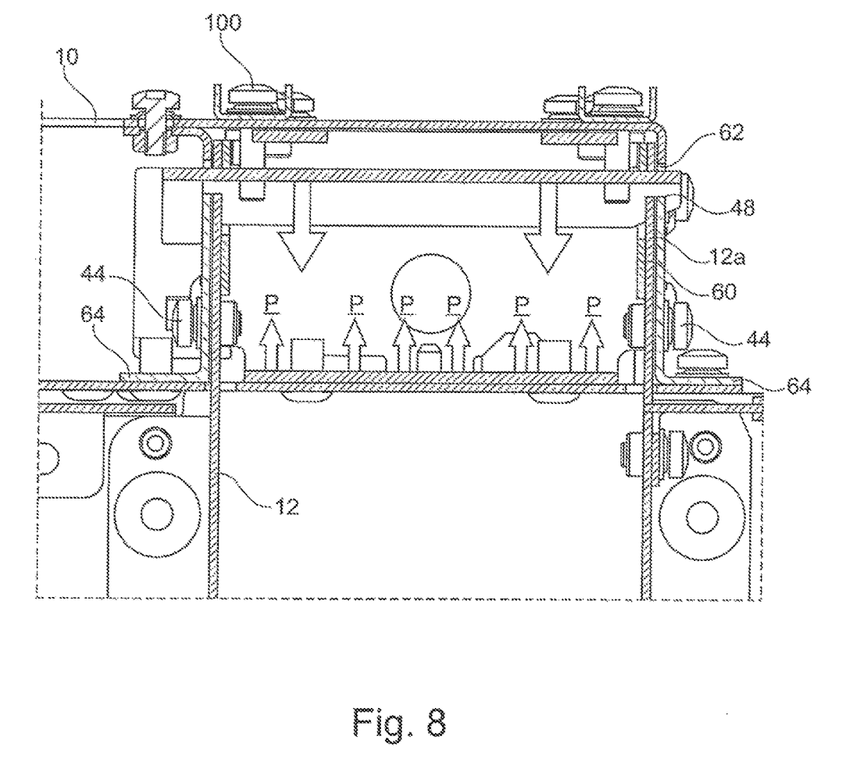
FIG. 8 shows a sectional view through the connection between the side plate and the cross beam, according to one example.

FIG. 8 shows a sectional view of the joint between the base plate 10 and one side plate 12, illustrating how the screws 100 and the U-shaped profile 48 generate a preloaded joint. FIG. 8 illustrates the axial preload or pulling force (P) generated by the screws and a respective counter force generated at the U-shaped profile 48. The preloaded contact between the base plate and the side plates, where a pulling force is introduced by screw 100 in a direction parallel to the side plates, allows to maintain good perpendicularity between the base plate and the side plates to be joined, without introducing bending moments between these parts. The joint is perfected by using traction and/or compression forces, without any bending forces. This kind of joint also achieves a high preload between the references of the side plates and the base plate, without losing parallel elastic-plastic energy and without deforming the elements to be joined. Further, the joint allows transmitting high forces throughout the contacting surfaces because the screws are operating in traction mode.

The joint between the base plate and the side plates, using the U-shaped profile 48 and screws 100, for axially tightening the side plates against the base plate, is completed, before additional (optional) connections are provided between the side plates and the base plate. After axially tightening the side plates against the base plate and "freezing" this connection, it is possible to provide additional joints between the base plate and the side plates. For example, the side plates can be fixed to the base plate by additional screws 44 as fastening means which are inserted sideways for providing a press fit between the side plates 12 and the base plate 10. Because the base plate 10 first is axially preloaded against the side plates 12 and because this preloaded joint is "frozen", providing additional screws or other fastening means which are inserted at different angles, e.g. perpendicular to the side plates, will not introduce bending forces but help to enhance the connection between the base plate and the side plates.

The cross sectional view of FIG. 8 illustrates how the base plate 10 is connected to one side plate 12 via the U-shaped profile 48 and screws 100. After this connection has been established and the preload applied by screws 100 is "frozen" by fully tightened the screws, the base plate 10 and the side plate 12 can additionally be fixed by screws 44 which are introduced perpendicularly to side plate 12 to connect side plate 12 and base plate 10 via L-shaped profiles 64, for example.

Instead of the U-shaped profile 48, a differently shaped tensioning component can be used. When the tensioning component is provided as a separate component, it can be inserted through recesses in the base plate 10 and the corresponding side plate 12 after the base plate and the side plates have been referenced and brought into contact.

After referencing and connecting the base plate 10 and the side plates 12, generating the preloaded axial joint and fixing and "freezing" this union, the initially open edge 10d of the base plate 10 can be closed, e.g. by screws, nuts 46 or other fastening means, as illustrated in FIGS. 3 and 4. At this time, because the base plate and the side plates have been referenced and fully connected, and also because the base plate profile is partly open, there is no risk of introducing any twist or elastic deformation into the structure when the side edge 10d of the base plate 10 is closed.

Figure 9:
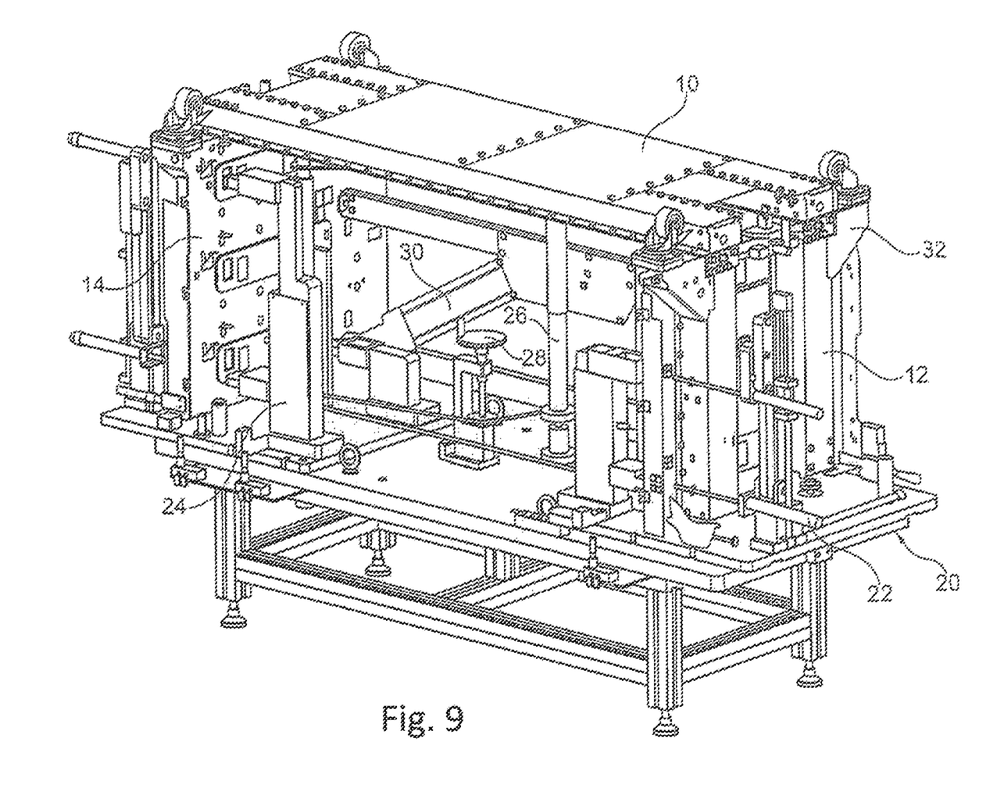
FIG. 9 shows an example of parts of a large format media handling system during assembly, held in an assembly tool, according to one example.

FIG. 9 shows an example of an assembly jig 20 for positioning and aligning the side plates 12, 14 in order to ensure that the base plate 10 is perfectly horizontally aligned when it has been attached to the side plates 12, 14. While the details of the assembly jig 20 are not relevant to this disclosure, just as a matter of example, the assembly jig 20 comprises horizontal and vertical alignment rods and columns 22, 24, 26 and an adjustment mechanism 28. Before mounting the base plate 10 to the side plates 12, 14, the side plates 12, 14 are positioned in the assembly jig 20, as shown in FIG. 9, for example. When properly positioned and aligned, the four fixed references 16 of the side plates 12, 14 will all lie within one and the same horizontal plane to accommodate the base plate 10 thereon.

FIG. 9 further shows that the side plates 12 may comprise enforcing ribs and further structural components. The supporting structure provided by the side plates 12, 14 further can be enforced by transverse beams 30, giving the overall assembly additional rigidity. FIG. 9 further shows that wheels 32 can be attached to the side plates 12, 14. Also the base plate 10, in addition to the closed profile schematically shown in FIG. 3, may include additional enforcement beams or other structures to increase rigidity and strength of the base plats 10.

Figure 10:
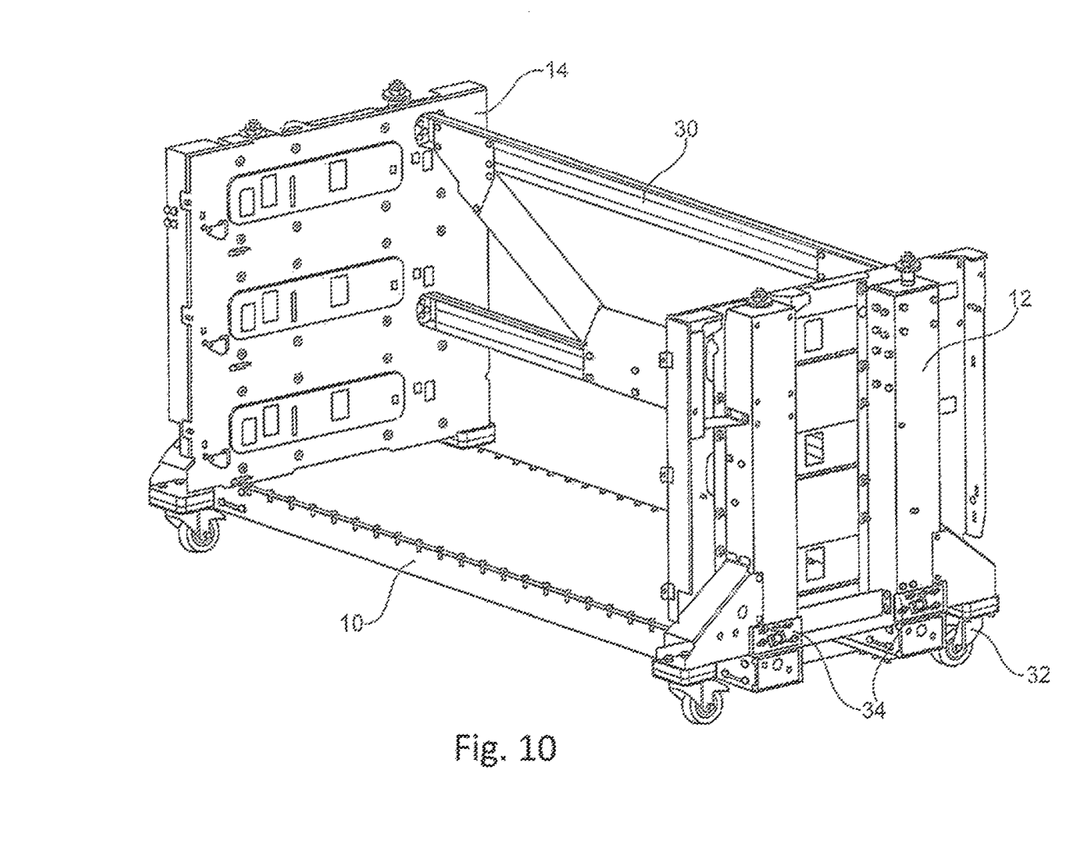
FIG. 10 shows a similar configuration as FIG. 9, after the assembly tool has been removed, according to one example.

FIG. 10 shows an example of the assembly comprising the base plate 10 and the side plates 12, 14, after they have been aligned relative to each other and fixed and after the assembly jig 20 shown in FIG. 9 has been removed. Once this assembly has been completed, it is turned upside down so that the base plate 10 together with the side plates 12, 14 can form a base support structure or mounting platform for a large format media handling system, such as a large format printer. Due to the precise alignment of the side plates 12, 14 in the mounting jig and the precise alignment of the base plate 10 relative to the side plates 12, 14, using the reference points, the base support structure shown in FIG. 10 can provide a highly accurate mounting platform and support for mounting any sub-systems of the large format media handling system. The closed shape of the base plate 10 in combination with rigid side plates 12, 14 and the multiple contact points between the base plate 10 and the side plates 12, 14 which are preloaded in the direction in which the base plate makes contact with the side plates, provide an isostatic joint of high structural stiffness. Hence superior dimensional accuracy is achieved and maintained which is good enough to enable, for example, IQ (image quality) resolutions equivalent to those reached by table-top size design jet printers or similar size media handling systems. The assembly, nevertheless, manages heavy subsystems and gives a good reference interface for each subsystem assembled on that structure.

Figure 11:
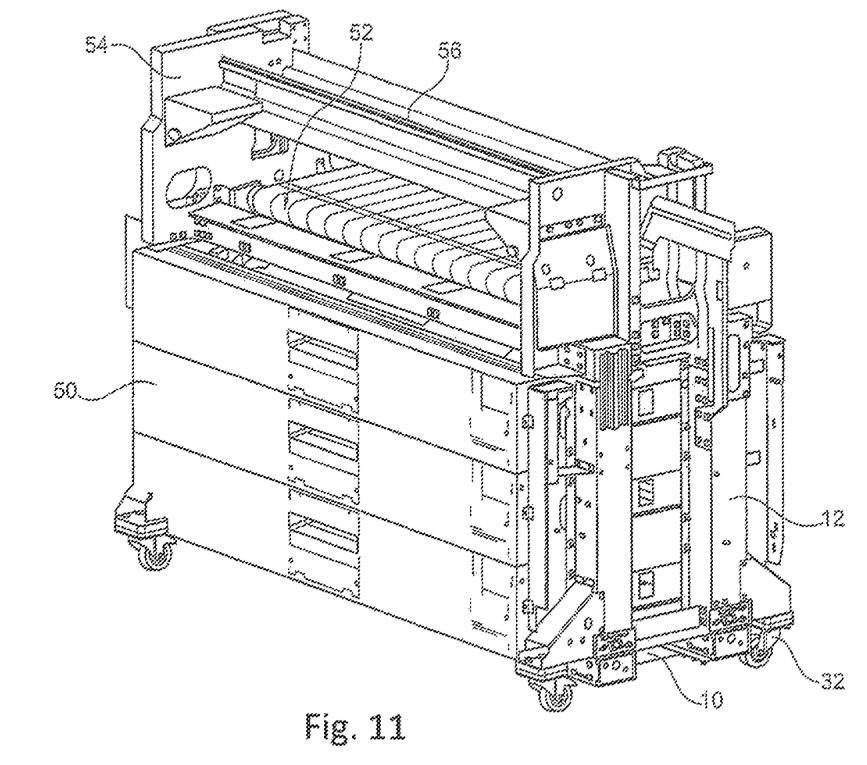
FIG. 11 shows an example of a semi-assembled large format printer which is built on the assembly shown in FIG. 10.

FIG. 11 shows an example of a partly assembled large format printer, based on the structure shown in FIG. 10. In the example shown in FIG. 6, the following sub-structures are mounted on the side plates; media input drawers 50; a vacuum platen system 52, including modular vacuum platens and vacuum belts; and a frame structure 54, 56 for supporting a carriage rod and printing carriage or a pen array print bar (not shown) for scanning over the print zone.

Figure 12:
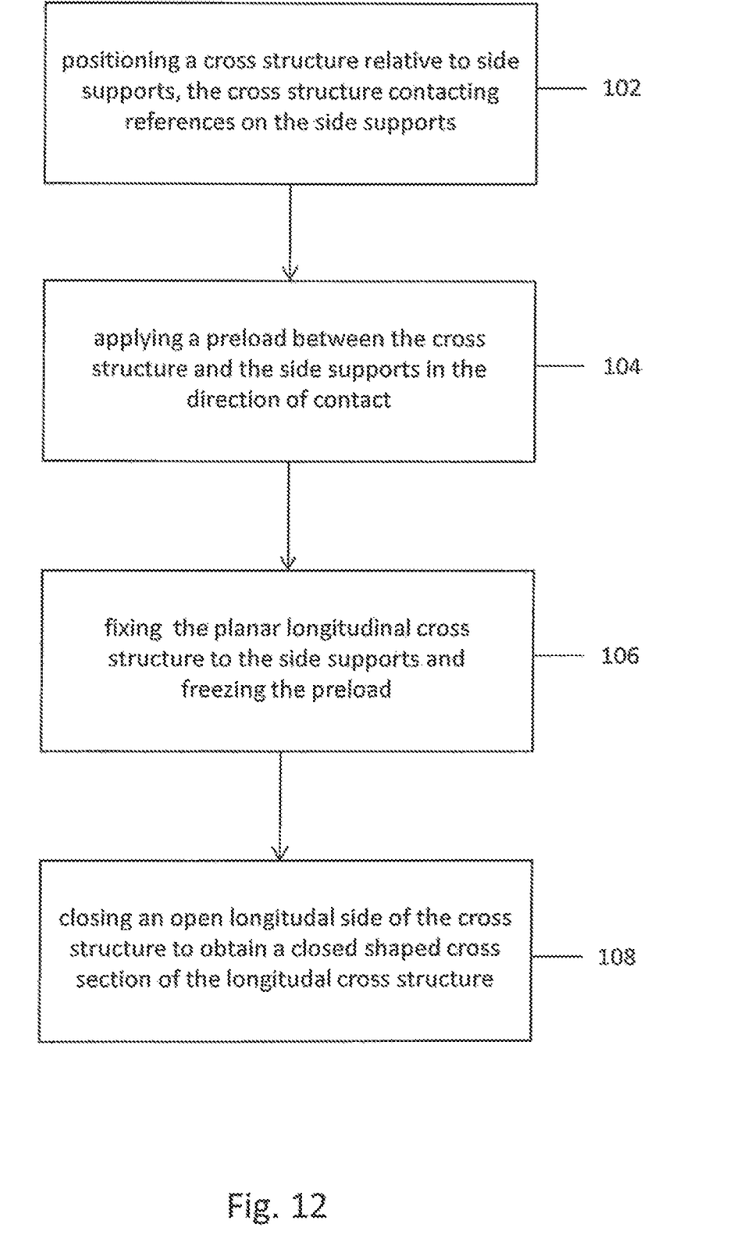
FIG. 12 shows a flow diagram of an example of a method of providing an assembly of a large format media handling system.

FIG. 12 shows an example of a method of providing an assembly of a large format media handling system. The method comprises positioning 102 a cross structure relative to side supports, wherein the cross structure is supported by side edges of the side supports and extends between the side supports, perpendicularly thereto, the cross structure contacting references on the side supports. As described, the cross structure can be a base plate 10 and the side supports can be side plates 12, 14 of a large format printer. Further, the side supports can be mounted in an assembly tool, as shown and described above. Once the cross structure has been positioned on the side supports, a preload is applied to the cross structure to tension the cross structure against the side edges of the side plates in a direction parallel to the side plates which is in a direction of making contact; see 104. Then, at 106, the planar longitudinal cross structure is fixed to the side supports and, at the same time, the preload between the cross structure and the side edges of the side supports is conserved or "frozen". The preload can be generated by a tensioning component, which is engaged with the side edges of the supports after the contact between the base plate and the side support has been established. The tensioning component may be a U-shaped profile, as illustrated in the example, or may be a profile file of different shape, a rod, or another suitable device. The preload can be applied e.g. by screws which extend through the surface of the base plate and into the tensioning component to pull the tensioning component and hence the side plates towards the base plate. Other means of applying the preload can be used, such as clamping fixtures, cable linkages. After the preload between the longitudinal cross structure and the side supports has been applied and frozen, additional fasting means can be used to provide additional joints between the cross structure and the side plates, such as by screws or nuts in combination with L-shaped profiles, brackets, plates or other suitable fastening means. Subsequently, at 108, an open longitudinal side of the cross structure is closed to obtain a closed shaped cross section of the longitudinal cross structure and improve rigidity of the overall support structure.

In one example, the assembly provides a mounting platform of a large format printer or other large format media handling device and the side supports comprise side plates supporting sub-structures of said printer or other media handling device. The side plates may support printer sub-structures, including at least one of: a print platen, a print head assembly, a print media transport system, a print media holder, a print media input section, and a print media output section, the printer sub-structures being aligned horizontally by said side plates and maintaining the high accuracy without introducing print medium misalignments, such as paper skew, or image quality defects.

The invention claimed is:

1. An assembly of a large format media handling system, the assembly including:
   a planar cross structure of a support structure, the support structure further including two side supports, wherein the two side supports extend perpendicularly to the cross structure and are connected to the cross structure at respective side edges of the side supports, the two side supports comprising both fixed and adjustable references, the cross structure contacting both the fixed and, after adjustment, the adjustable references; and
   a tensioning component associated with each of the side supports, wherein the tensioning component transmits a tensioning force between the cross structure and the side edges of the side supports in a direction parallel to the side supports.

2. The assembly of claim 1 wherein the tensioning component extends through the side supports at the respective side edges thereof and is fixed to the cross structure at a side of the cross structure opposite to the side supports to pull the side supports against the cross structure.

3. The assembly of claim 1 wherein the side supports compose projections extending from the side edges and into corresponding recesses of the cross structure; and wherein the tensioning component extends through the projections and the cross structure and is fixed to the cross structure to apply a pulling force from the cross structure to the side supports.

4. The assembly of claim 3 wherein at least two projections extend from each one of the side edges of the side supports wherein each tensioning component extends through said projections in a direction parallel to the respective side edges.

5. The assembly of claim 4 wherein the tensioning component comprises a U-shaped profile.

6. The assembly of claim 4 wherein the side supports comprise side plates.

7. The assembly of claim 1 wherein the tensioning component comprises a U-shaped profile.

8. The assembly of claim 1 wherein each adjustable reference comprises a wedge that is moveable for adjustment in a lateral direction.

9. The assembly of claim 1 further comprising transverse beam between the side plates for additional rigidity.

10. A method of assembling a support structure of a media handling system, the support structure comprising a cross structure and two side supports, the method comprising:
    positioning the cross structure relative to the side supports whereby the cross structure is supported by side edges of the side supports and extends between the two side supports perpendicularly thereto;
    with the cross structure in contact with a number of fixed references on the side supports, applying a force to impart a torsional movement to the cross structure so that the cross structure contacts an additional fixed reference on the side supports; and
    fixing the cross structure to the side supports wherein fixing the cross structure includes applying a tensioning force between the cross structure and the side edges of the side supports in a direction parallel to the side supports.

11. The method of claim 10 wherein fixing the cross structure includes associating a tensioning component with the side edges of the side supports and fixing the tensioning component to the cross structure.

12. The method of claim 11 wherein the tensioning component is inserted in corresponding recesses at the side edges of the side support.

13. The method of claim 11 wherein the tensioning component is fixed to the cross structure by pulling the tensioning component towards the cross structure.

14. The method of claim 13 wherein screws are inserted into the cross structure from a side opposite to the side supports and the screws are threaded into the tensioning component to pull the side supports towards the cross structure.

15. The method of claim 10 wherein the cross structure is fixed to the side supports applying a force in a direction perpendicular to the side supports after the tensioning force has been applied and conserved.

16. The method of claim 10 wherein the assembly of the cross structure and the side supports, after having been fixed to each other, is turned upside down to provide a base plate and side plates of a large format printer.

17. The method of claim 10 further comprising adjusting a number of adjustable references of the side supports to contact the cross structure, establishing contact points between the cross structure and side supports includes both the fixed and adjustable references.

18. The method of claim 10 further comprising using an assembly jig for positioning and aligning the side plates to ensure that the cross structure is horizontally aligned for attachment to the side plates.

19. An assembly of a large format media handling system, the assembly comprising:
   a cross beam;
   a support structure including two side plates, wherein the two side plates extend perpendicularly to the cross beam and are connected to the cross beam at respective side edges of the side plates;
   a tensioning profile associated with each of the side edges of the side plates, wherein each tensioning profile is disposed in a recess in the cross beam and the cross beam is fixed to the tensioning profiles; and
   screws inserted into the cross beam from a side opposite to the side plates, wherein the screws are threaded into the tensioning profile to pull the side plates towards the cross beam.

20. The assembly of claim 19 wherein the two side plates comprising both fixed and adjustable references, the cross beam contacting both the fixed and, after adjustment, the adjustable references.

* * * * *

UNITED STATES PATENT AND TRADEMARK OFFICE
CERTIFICATE OF CORRECTION

PATENT NO. : 10,105,978 B2  
APPLICATION NO. : 15/313443  
DATED : October 23, 2018  
INVENTOR(S) : Ricardo Sanchis Estruch et al.

Page 1 of 1

It is certified that error appears in the above-identified patent and that said Letters Patent is hereby corrected as shown below:

On the Title Page

In Column 1, item (72), Inventors, Line 5, delete "San" and insert -- Sant --, therefor.

In the Drawings

In sheet 11 of 11, FIG. 12, reference numeral 108, Line 1, delete "longitudal" and insert -- longitudinal --, therefor.

In sheet 11 of 11, FIG. 12, reference numeral 108, Line 3, delete "longitudal" and insert -- longitudinal --, therefor.

In the Claims

In Column 8, Claim 3, Line 7, delete "compose" and insert -- comprise --, therefor.

Signed and Sealed this  
Thirtieth Day of April, 2019

Andrei Iancu  
*Director of the United States Patent and Trademark Office*